(12) United States Patent
Yoon et al.

(10) Patent No.: US 9,573,637 B2
(45) Date of Patent: Feb. 21, 2017

(54) APPARATUS FOR IMPROVING AERODYNAMIC CHARACTERISTICS OF VEHICLE

(71) Applicant: HYUNDAI MOTOR COMPANY, Seoul (KR)

(72) Inventors: Jin Young Yoon, Gimpo-si (KR); Hyun Gyung Kim, Hwaseong-si (KR); Tae Hyung Kim, Incheon (KR); Joung Ho Lee, Seongnam-si (KR); Seung Mok Lee, Osan-si (KR); Dong Eun Cha, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 36 days.

(21) Appl. No.: 14/667,534

(22) Filed: Mar. 24, 2015

(65) Prior Publication Data
US 2016/0137236 A1     May 19, 2016

(30) Foreign Application Priority Data

Nov. 14, 2014    (KR) ........................ 10-2014-0158623

(51) Int. Cl.
*B62D 35/00* (2006.01)
*B62D 35/02* (2006.01)
*B62D 25/16* (2006.01)

(52) U.S. Cl.
CPC ............... *B62D 35/02* (2013.01); *B62D 25/16* (2013.01)

(58) Field of Classification Search
CPC ................................ B60D 35/02; B60D 25/16
See application file for complete search history.

(56) References Cited

U.S. PATENT DOCUMENTS

| 8,297,685 | B2 * | 10/2012 | Wolf | ...................... B62D 35/02 |
| | | | | 296/180.1 |
| 8,474,557 | B2 * | 7/2013 | Wolf | ........................ B60T 5/00 |
| | | | | 180/68.1 |

FOREIGN PATENT DOCUMENTS

| JP | 2006-264511 A | 10/2006 |
| JP | 2007-253929 A | 10/2007 |
| JP | 2009-149130 A | 7/2009 |
| JP | 2009-248746 A | 10/2009 |
| JP | 4559012 B2 | 10/2010 |
| KR | 20-1998-025728 U | 8/1988 |

OTHER PUBLICATIONS

Office Action issued in corresponding Korean Patent Application No. 10-2014-0158623, mailed on Nov. 12, 2015.

* cited by examiner

*Primary Examiner* — Lori L Lyjak
(74) *Attorney, Agent, or Firm* — McDermott Will & Emery LLP

(57) ABSTRACT

An apparatus for improving the aerodynamic characteristics of a vehicle includes a first vane configured to be rotatable on a wheel guard. An actuator is configured to provide the first vane with rotational force so as to rotate the first vane. A controller is configured to receive vehicle speed information and steering angle information of a steering wheel, and to control the operation of the actuator.

14 Claims, 5 Drawing Sheets

APPARATUS FOR IMPROVING AERODYNAMIC CHARACTERISTICS OF VEHICLE

CROSS-REFERENCE(S) TO RELATED APPLICATIONS

The present application claims the benefit of priority to Korean Patent Application Number 10-2014-0158623 filed on Nov. 14, 2014, the entire contents of which application are incorporated herein for all purposes by this reference.

TECHNICAL FIELD

Exemplary embodiments of the present inventive concept relate to an apparatus for improving the aerodynamic characteristics of a vehicle; and, particularly, to a technology for an apparatus capable of improving the aerodynamic characteristics of a vehicle using a wheel guard vane, the angle of which varies depending on a vehicle speed and a steering angle of a steering wheel.

BACKGROUND

The aerodynamic characteristics of a vehicle are the general term for power which is applied to the vehicle by air flow during travel, and are one of factors which determine stability, fuel efficiency improvement, noise, and the like during high-speed travel. Various researches have been conducted to improve the aerodynamic characteristics of a vehicle.

As a solution for improving the aerodynamic characteristics of a vehicle, there is a structure in which a baffle 2 is fixed inside a wheel guard 1 of a vehicle, as shown in FIG. 1.

However, according to the conventional structure as described above, since the baffle 2 is fixed on the wheel guard 1, it is impossible to reduce the aerodynamic force to an optimal state according to changes in a vehicle speed and a steering angle of a steering wheel.

The information disclosed in this Background of the Invention section is only for enhancement of understanding of the general background of the invention and should not be taken as an acknowledgement or any form of suggestion that this information forms the prior art already known to a person skilled in the art.

SUMMARY

An embodiment of the present inventive concept is directed to an apparatus for improving the aerodynamic characteristics of a vehicle, which can improve the aerodynamic characteristics of the vehicle to an optimal state by providing, inside a wheel guard of a vehicle, an active vane the angle of which actively varies depending on a vehicle speed and a steering angle of a steering wheel.

Other objects and advantages of the present invention can be understood by the following description, and become apparent with reference to the embodiments of the present invention. Also, the objects and advantages of the present invention can be realized by the means as claimed and combinations thereof.

In accordance with an embodiment of the present inventive concept, an apparatus for improving aerodynamic characteristics of a vehicle includes: a first vane configured to be rotatable on a wheel guard; an actuator configured to provide the first vane with rotational force so as to rotate the first vane; and a controller configured to receive vehicle speed information and steering angle information of a steering wheel, and to control the operation of the actuator.

The first vane may be configured to be positioned above a tire.

The first vane may be configured to rotate in a direction which is substantially the same as a steering direction of the steering wheel.

The controller may be configured to control the first vane not to perform a rotation operation when the vehicle speed is less than 70 km/h. In certain embodiments, the controller may be configured to control the first vane to perform a rotation operation only when the steering angle of the steering wheel varies and the vehicle speed is 80 km/h or more.

The actuator may include: a vane gear coupled to a rotational axis of the first vane; a driving motor spaced apart from the wheel guard; a worm wheel gear and a worm gear coupled to the driving motor; and intermediate gears configured to connect the worm wheel gear and the vane gear so as to transfer power.

The vane may be mounted within a range of 30 degrees in the front and rear directions, respectively, of the vehicle with respect to a vertical line passing through the center of the axis of a tire on the basis of a state of viewing a side surface of the tire.

In certain embodiments, the first vane may be within a range of 30 degrees with respect to a vertical line passing through the center of a tire when viewed along the axis of rotation of the tire.

In certain embodiments, the apparatus may further include a second vane. The second vane may be positioned within a range of 30 degrees with respect to the vertical line passing through the center of the tire when viewed along the axis of rotation of the tire. The two vanes may be circumferentially spaced along the direction of rotation of the tire.

The first and second vanes may be on a side of the tire closer to the center of the vehicle with respect to a first reference line bisecting the tire into left and right when viewed from a position perpendicular to the axis of rotation of the tire.

In certain embodiments, the first vane may be positioned on a side of the tire closer to the center of the vehicle with respect to the first reference line, and simultaneously positioned at a front side of the vehicle with respect to a second reference line in the direction of the rotational axis of the tire bisecting the tire into the front side and a rear side.

When there are two vanes, the first vane may be positioned at a front side of the vehicle with respect to the second reference line. The second vane may be positioned at the rear side of the vehicle with respect to the second reference line.

The first vane may have a front end and a rear end, where the front end closer to the front of the vehicle than the rear end when the axis of rotation of the tire is perpendicular to a main body of a vehicle, The first vane may be inclined with respect to the first reference line so the rear end is closer than the front end to the center of the vehicle. The inclined angle of the first vane may be in the range of 20 to 30 degrees.

BRIEF DESCRIPTION OF THE DRAWINGS

FIGS. 2 to 6 are views showing an apparatus for improving aerodynamic characteristics in accordance with an embodiment of the present inventive concept, wherein FIGS. 2 and 3 are views showing an example in which a single vane is provided, and FIGS. 4 and 5 are views showing another example in which two vanes are provided.

DETAILED DESCRIPTION

Figure 1:
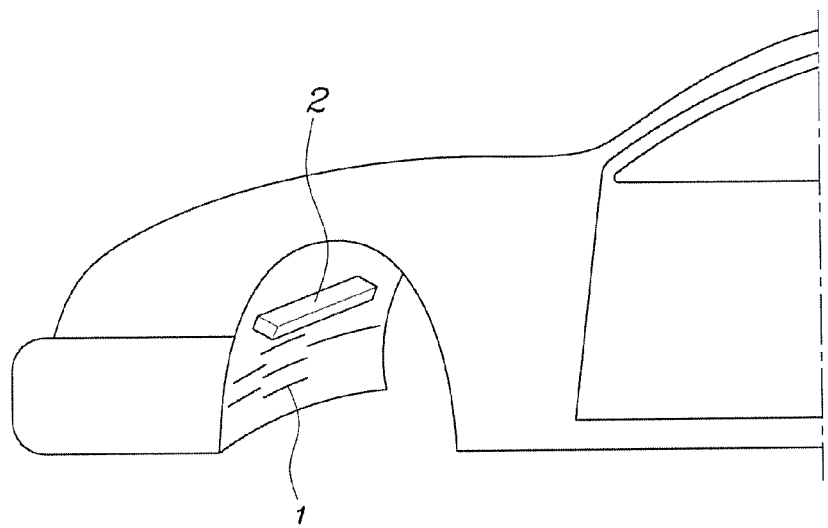
FIG. 1 is a view showing a conventional apparatus for improving aerodynamic characteristics.

An apparatus for improving the aerodynamic characteristics of a vehicle in accordance with exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An apparatus for improving the aerodynamic characteristics of a vehicle in accordance with an embodiment of the present inventive concept pertains to a technology of actively varying the mounting angle of a vane, depending on changes in a vehicle speed and a steering angle of a steering wheel.

That is to say, as shown in FIGS. 2 to 6, the apparatus includes: a first vane 20 rotatably mounted inside a wheel guard 10; an actuator 30 configured to provide the first vane 20 with rotational force so that the first vane 20 can rotate; and a controller 60 configured to receive vehicle speed information detected by a vehicle speed sensor 40 and steering angle information of a steering wheel detected by a steering angle sensor 50, and to control the operation of the actuator 30.

It is preferred that the first vane 20 is mounted to be positioned above a tire 71 so as to exert an optimal aerodynamic characteristic improvement effect. In addition, when the first vane 20 is mounted to be positioned above the tire 71, it is possible to easily secure a gap between the first vane 20 and the path of left and right rotation of the tire 71 according to steering of a steering wheel.

In accordance with an embodiment of the present invention, the first vane 20 is configured to rotate in substantially the same direction as the steering direction of the steering wheel, so that air staying in the wheel guard 10 can be easily discharged to the outside according to the steering of the steering wheel, thereby exerting an optimal aerodynamic characteristic improvement effect.

In certain embodiments, the controller 60 is configured to control the first vane 20 not to perform a rotation operation when the vehicle speed is less than 70 km/h. In certain embodiments, the controller 60 is configured to control the first vane 20 to perform a rotation operation only when the steering angle of the steering wheel varies at a vehicle speed of 80 km/h or more.

When a vehicle speed is less than 70 km/h, the rolling resistance of the vehicle is often larger than the air resistance, so that it is not required to rotate the first vane 20. In contrast, when a vehicle speed is 80 km/h or more, the air resistance may be greater than the rolling resistance of the vehicle, and it may be required to rotate the first vane 20 according to a change in the steering angle of the steering wheel so as to improve the aerodynamic characteristics of the vehicle.

In certain embodiments, the vehicle speed range from 70 km/h to 80 km/h is a hysteresis range according to the control of the vehicle, wherein the on and off ranges for the operation of the first vane 20 can be tuned by appropriately applying different hysteresis ranges depending on the types of vehicles.

In certain embodiments of the present invention, the actuator 30 includes: a vane gear 31 coupled to the rotational axis 21 of the first vane 20; a driving motor 32 spaced apart from the wheel guard 10; a worm wheel gear 34 and a worm gear 33 coupled to the driving motor 32; and intermediate gears 35 configured to connect the worm wheel gear 34 and the vane gear 31 so as to transfer power.

In certain embodiments, the rotational axis 21 is mounted to extend through the wheel guard 10 and to protrude to the outside of the wheel guard 10, the driving motor 32 is fixed on a housing 72 at a state spaced from the wheel guard 10, and the housing 72 is fixed on the wheel guard 10.

Figure 2:
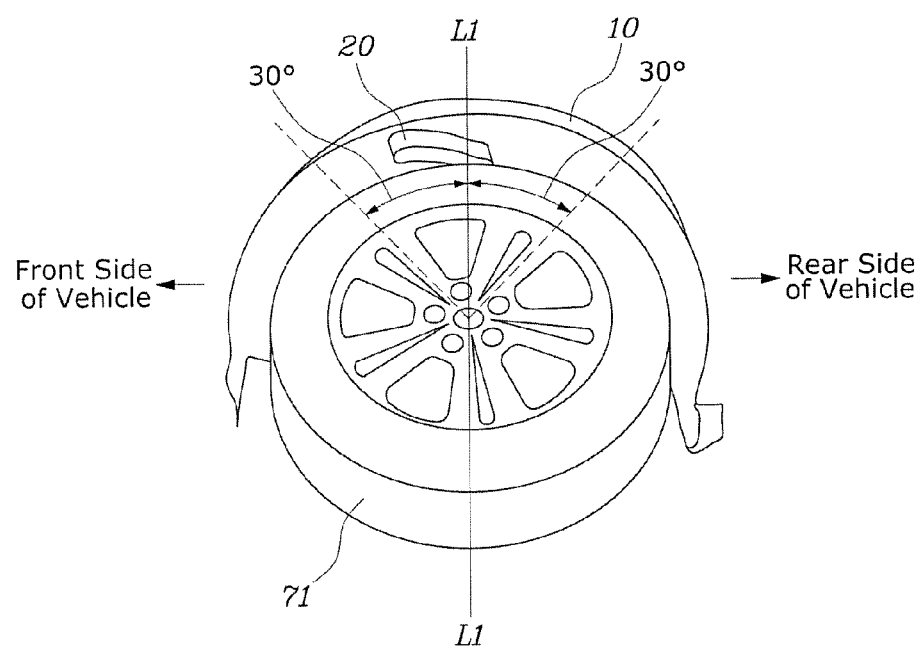
Figure 4:
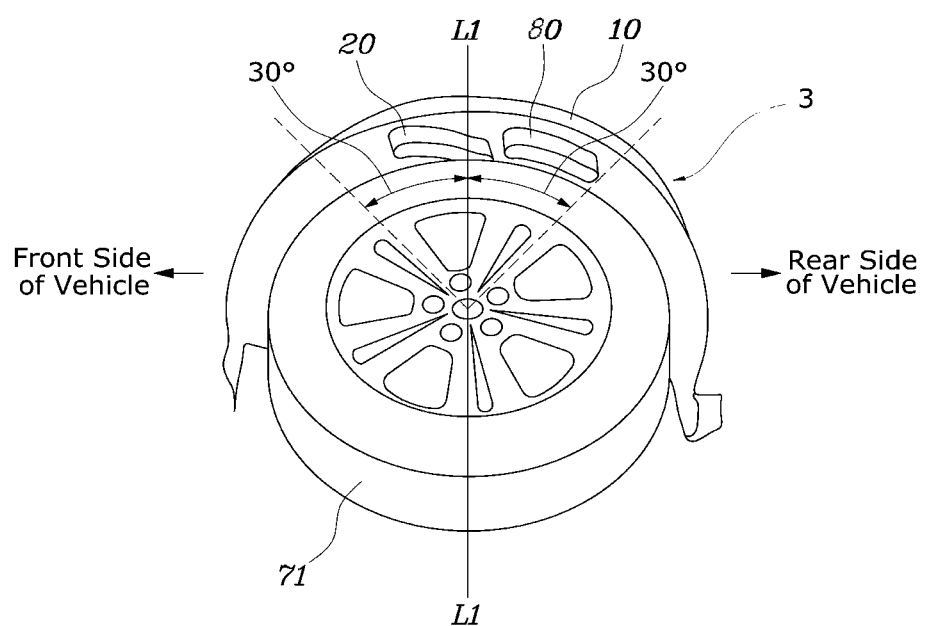

As shown in FIGS. 2 and 4, in order to exert an optimal aerodynamic characteristic improvement effect, in certain embodiments it is preferred that the first vane 20 is mounted within a range of 30 degrees in the front and rear directions, respectively, of the vehicle with respect to a vertical line L1 passing through the center of the tire 71 when viewed along the axis of rotation of the tire 71. In certain embodiments, a second vane 80 may be added (for example, see FIG. 4). In certain embodiments, the second vane 80 may be positioned within a range of 30 degrees in the front and rear directions, respectively, of the vehicle with respect to the vertical line L1, as shown in FIG. 4.

According to the shape (or type) of the vehicle and/or the interior conditions of the wheel guard 10, adding the second vane 80 may more greatly improve the aerodynamic characteristics than a single vane.

When there is a second vane 80, in certain embodiments the two vanes may circumferentially spaced along the direction of rotation of the tire so as to minimize air resistance and to improve aerodynamic characteristics.

Figure 3:
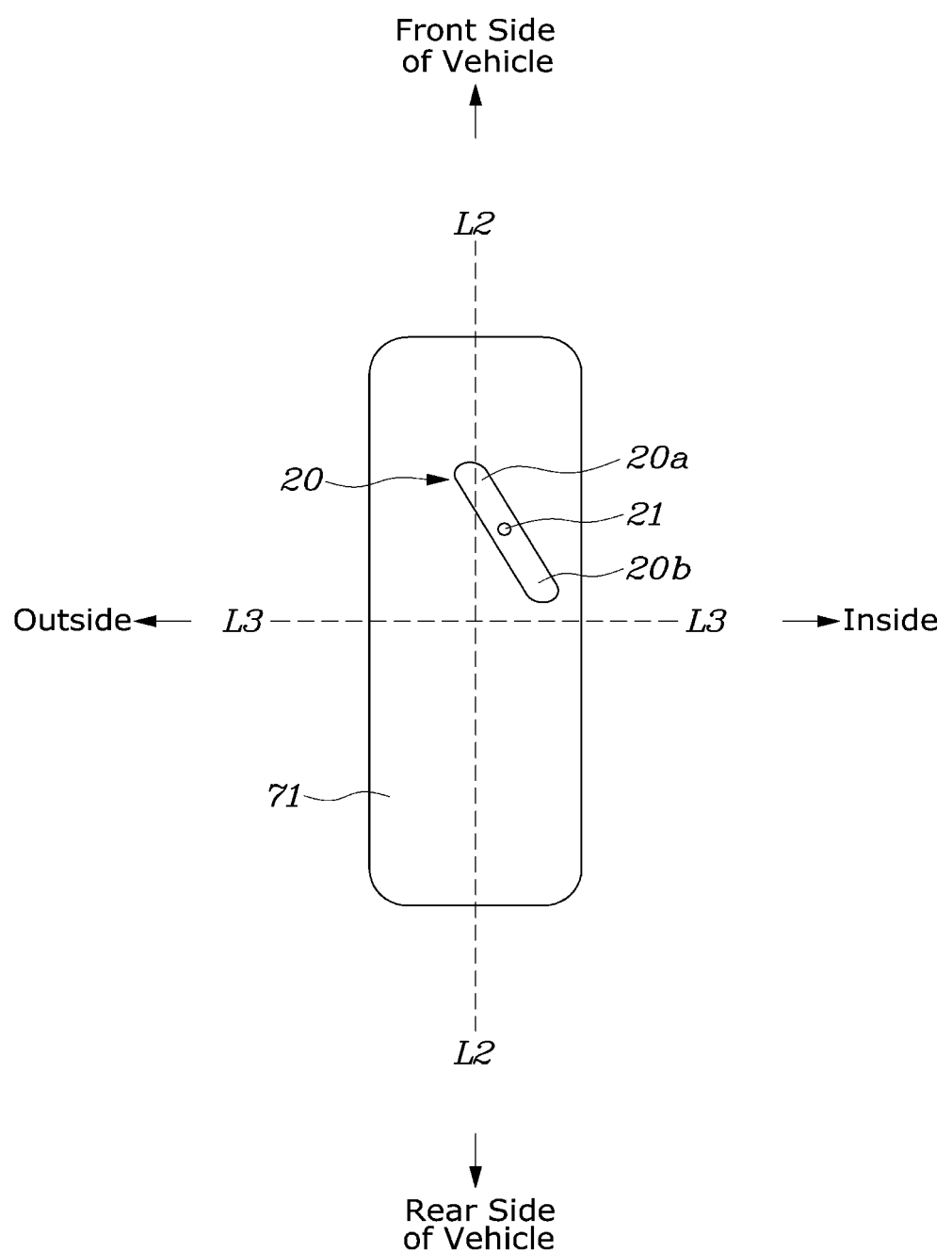
Figure 5:
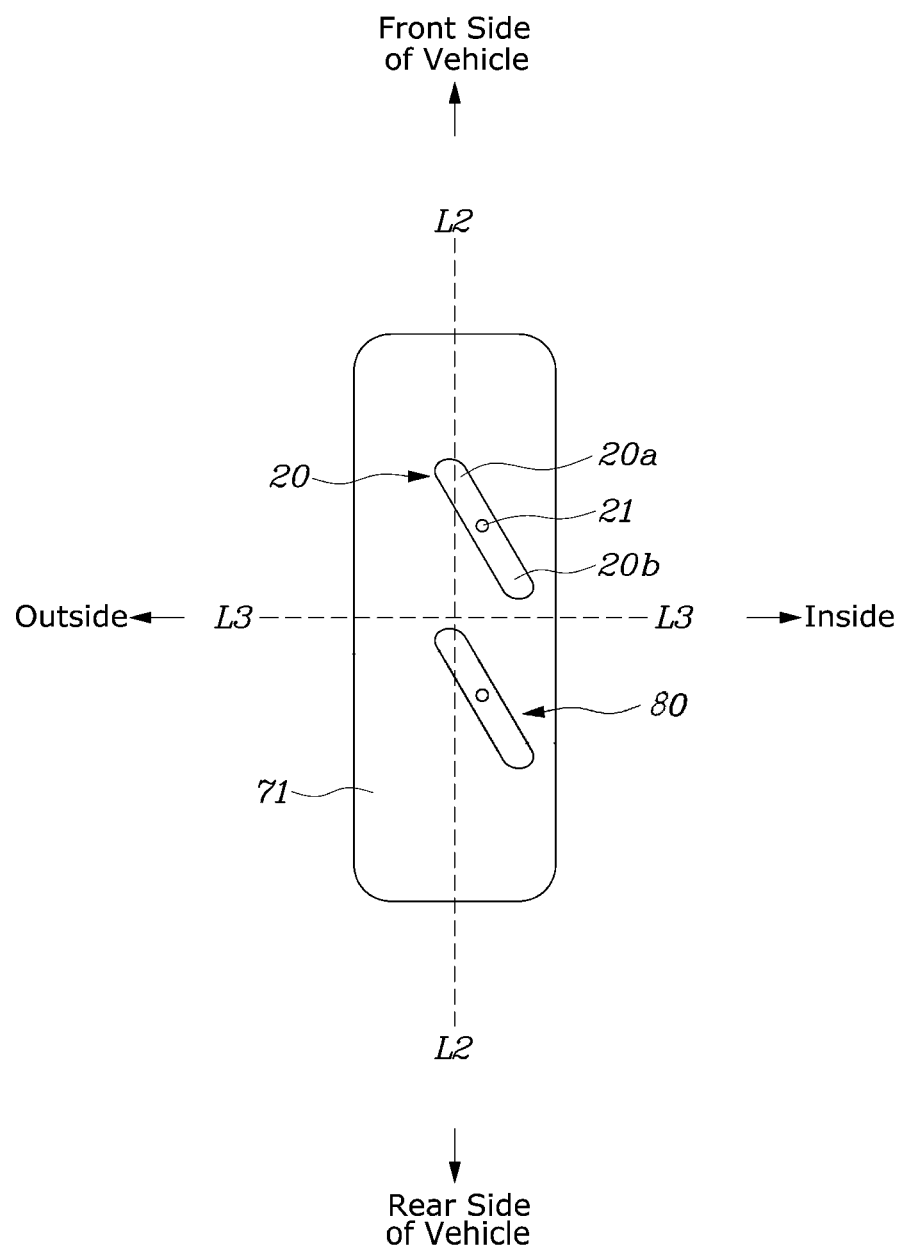
Figure 6:
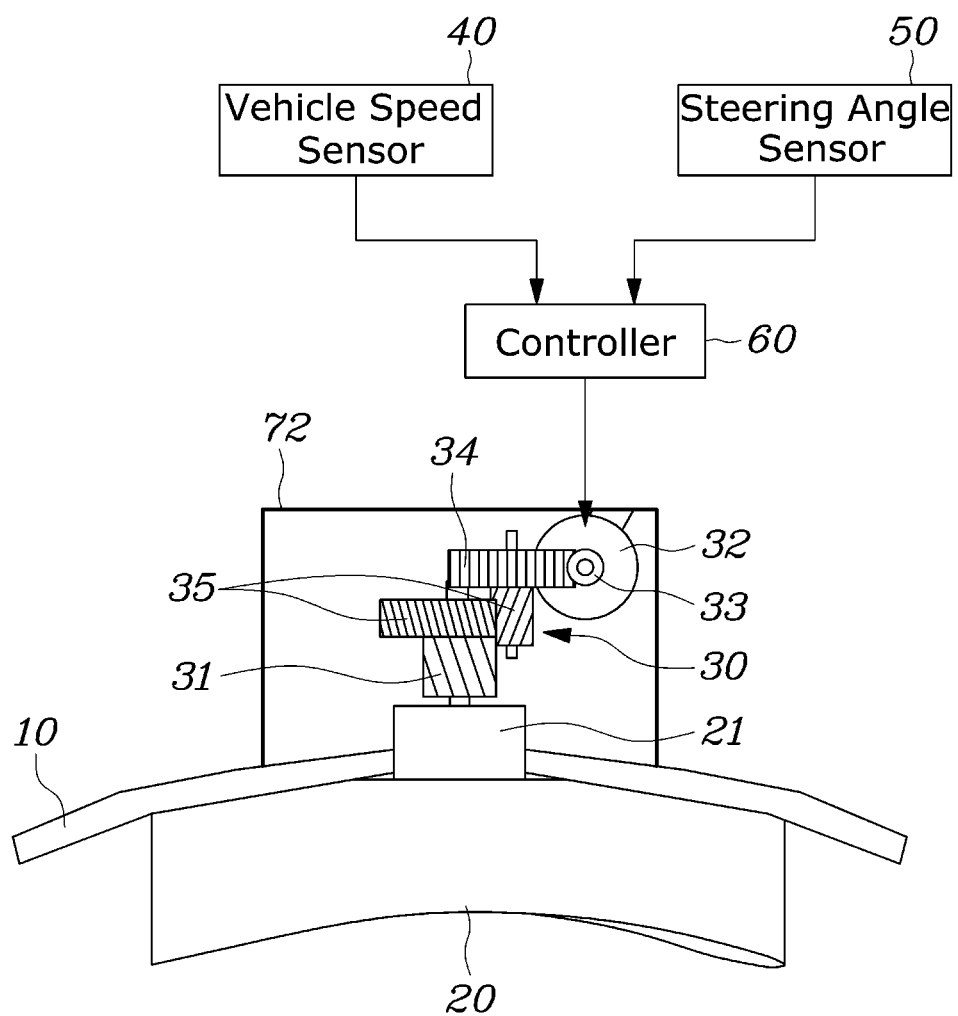

As shown in FIGS. 3 and 5, in certain embodiments, it is preferred that the first vane 20 be positioned on a side of the tire closer to the center of the vehicle with respect to a first reference line L2 bisecting the tire 71 into left and right when viewed from a position perpendicular to the axis of rotation of the tire 71, in order to easily discharge air staying in the inside of the vehicle in the wheel guard 10 to the outside, and thus to exert an optimal aerodynamic characteristic improvement effect.

In addition, as shown in FIG. 3, when the apparatus is configured with a single vane (first vane 20), in order to exert an optimal aerodynamic characteristic improvement effect, it is preferred that the first vane 20 be positioned on a side of the tire closer to the center of the vehicle with respect to the first reference line L2, and simultaneously positioned at the front side of the vehicle with respect to a second reference line L3 in the direction of the rotational axis of the tire bisecting the tire 71 into a front side and a rear side (the area of a first quadrant among four quadrants divided by the first reference line and the second reference line).

In addition, as shown in FIG. 5, is certain embodiments, the apparatus is configured with first and second vanes 20 and 80, in order to exert an optimal aerodynamic characteristic improvement effect. In certain embodiments, it is preferred that the first vane 20 be positioned on a side of the tire closer to the center of the vehicle with respect to the first reference line L2, and simultaneously positioned at the front side of the vehicle with respect to the second reference line L3 bisecting the tire 71 into a front side and a rear side (the area of a first quadrant among four quadrants divided by the first reference line and the second reference line). The second vane 80 may be positioned on the side of the tire closer to the center of the vehicle with respect to the first reference line L2, and simultaneously positioned at the rear side of the vehicle with respect to the second reference line L3 (the area of a fourth quadrant among the four quadrants divided by the first reference line and the second reference line).

Meanwhile, when the axis of rotation of the tire 71 is perpendicular to a main body 3 of the vehicle, the first vane 20 is mounted to be inclined with respect to the first reference line L2, as shown in FIGS. 3 and 5, the rear side 20b thereof is closer to the center of the vehicle than the front side 20a of the first vane 20. Specifically, in certain embodiments, it is preferred that the first vane 20 be mounted at an inclined angle in the range of 20 to 30 degrees, thereby exerting an optimal aerodynamic characteristic improvement effect.

As described above, in accordance with certain embodiments of the present inventive concept, the mounted angle of the first vane 20 mounted on the wheel guard 10 actively varies depending on changes in the vehicle speed and the steering angle of the steering wheel, thereby exerting an optimal aerodynamic characteristic improvement effect.

In accordance with the exemplary embodiments of the present inventive concept, the mounted angle of the first vane 20 mounted on the wheel guard 10 may actively vary depending on changes in the vehicle speed and the steering angle of the steering wheel, thereby exerting an optimal aerodynamic characteristic improvement effect.

While the present invention has been described with respect to the specific embodiments, it will be apparent to those skilled in the art that various changes and modifications may be made without departing from the spirit and scope of the invention as defined in the following claims.

What is claimed is:

1. An apparatus for improving aerodynamic characteristics of a vehicle, the apparatus comprising:
   a first vane configured to be rotatable on a wheel guard;
   an actuator configured to provide the first vane with rotational force so as to rotate the first vane; and
   a controller configured to receive vehicle speed information and steering angle information of a steering wheel, and to control the operation of the actuator.

2. The apparatus of claim 1, wherein the first vane is positioned above a tire.

3. The apparatus of claim 1, wherein the first vane is configured to rotate in a direction which is substantially the same as a steering direction of the steering wheel.

4. The apparatus of claim 1, wherein the controller is configured to control the first vane not to perform a rotation operation while the vehicle speed is less than 70 km/h.

5. The apparatus of claim 1, wherein the controller is configured to control the first vane to perform a rotation operation only when the steering angle of the steering wheel varies and the vehicle speed is 80 km/h or more.

6. The apparatus of claim 1, wherein the actuator comprises:
   a vane gear coupled to a rotational axis of the first vane;
   a driving motor spaced apart from the wheel guard;
   a worm wheel gear and a worm gear coupled to the driving motor; and
   intermediate gears configured to connect the worm wheel gear and the vane gear so as to transfer power.

7. The apparatus of claim 1, wherein the first vane is mounted within a range of 30 degrees with respect to a vertical line passing through the center of a tire when viewed along the axis of rotation of the tire.

8. The apparatus of claim 7, further comprising a second vane mounted within a range of 30 degrees with respect to the vertical line passing through the center of the tire when viewed along the axis of rotation of the tire, and wherein a first reference line bisects the tire into left and right sides when viewed from a position perpendicular to the axis of rotation of the tire.

9. The apparatus of claim 8, wherein, the first and second vanes are circumferentially spaced along the direction of rotation of the tire.

10. The apparatus of claim 8, wherein the first and second vanes are positioned on a side of the tire closer to the center of the vehicle with respect to the first reference when viewed from a position perpendicular to the axis of rotation of the tire.

11. The apparatus of claim 7, wherein, the first vane is positioned on a side of the tire closer to the center of the vehicle with respect to the first reference line, and simultaneously positioned at a front side of the vehicle with respect to a second reference line in the direction of the rotational axis of the tire bisecting the tire into the front side and a rear side.

12. The apparatus of claim 10, wherein the first vane is positioned at a front side of the vehicle with respect to a second reference line in the direction of the rotational axis of the tire bisecting the tire into the front side and a rear side; and
   the second vane is positioned at the rear side of the vehicle with respect to the second reference line.

13. The apparatus of claim 7, wherein the first vane has front end and a rear end, the front end closer to the front of the vehicle than the rear end when the axis of rotation of the tire is perpendicular to a main body of the vehicle, and the first vane is inclined with respect to the first reference line so that the rear end is closer than the front end to the center of the vehicle.

14. The apparatus of claim 13, wherein an inclined angle of the first vane is in the range of 20 to 30 degrees.

* * * * *